Patented Jan. 4, 1944

2,338,115

UNITED STATES PATENT OFFICE 2,338,115

PROCESS OF OXIDIZING URONIC ACIDS

Horace S. Isbell, Washington, D. C., assignor to the Government of the United States, represented by the Secretary of Commerce No Drawing. Application July 30, 1942, Serial No. 452,909

6 Claims. (Cl. 260—535)

(Granted under the act of March 3, 1883, as amended April 30, 1928; 370 O. G. 757)

The invention described herein may be manufactured and used by or for the Government for governmental purposes without the payment to me of any royalty thereon.

It is an object of the present invention to provide an improved process for the oxidation of the aldehyde group of uronic acids to their corresponding acids or salts.

A more specific object of the present invention is to provide a simple process for the conversion of galacturonic acid to mucic acid.

Heretofore, various methods have been used for converting aldehyde groups in sugars and other carbohydrates, to carboxyl groups, but these methods have not always been satisfactory. The most widely used reagent for this conversion is iodine in alkaline solution. Iodine, however, does not oxidize aldehyde groups in neutral or acid solution, while in alkaline solution, an excess of iodine causes undesirable oxidation of other groups. Moreover, alkaline solutions are detrimental to many carbohydrates because of hydrolysis and degradation. In such cases, iodine is not suitable and other reagents must be employed. Bromine, for example, oxidizes aldehyde groups in either acid or alkaline solution, but it attacks other groups slowly and in some cases causes considerable degradation.

In accordance with the present invention, these undesirable results are overcome by a process in which oxidation of the aldehyde groups is effected with chlorous acid. By this process, a substantially quantitative oxidation of the aldehyde groups to carboxyl groups is obtained, without damage to alkali-sensitive compounds or linkages in the carbohydrate substance. The chlorous acid is formed in solution from a chloride and may be liberated slowly, as by hydrolysis, or rapidly by the addition of an acid.

In the practice of the invention, the aldehyde groups of glucose, xylose, rhamnose, lactose, galacturonic acid, glucuronic acid and other similar substances have been oxidized to carboxyl groups with chlorous acid. This chlorous acid may be generated from sodium chlorite, calcium chlorite, and magnesium chlorite by the addition of various acids, among which are acetic, carbonic, hydrochloric, phosphoric and sulfuric acids.

Example 1

If the process of the present invention is used in connection with an acidic substance, such as galacturonic acid, the procedure is as follows: Three grams of calcium chlorite are added to a cold solution containing one gram of galacturonic acid. In the course of a few minutes, crystalline calcium mucate separates from the solution. The reaction appears to be as follows:

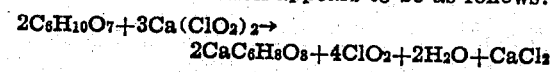

$$2CaC_6H_8O_8 + 4ClO_2 + 2H_2O + CaCl_2$$

The calcium mucate thus formed is conveniently separated by filtration. It may then be converted to mucic acid by treatment with hydrochloric acid and the crystallization of the resulting mucic acid.

Example 2

Should the process of the present invention be used in connection with such aldose sugars as glucose, then the several steps are conveniently as follows: A cold ten percent solution of d-glucose containing approximately 2 moles of calcium chlorite for each mole of glucose is treated with an equivalent quantity of aqueous phosphoric acid. The amount of chlorite used is approximately $\frac{1}{3}$ in excess of the theoretical amount. The chlorous acid liberated by the phosphoric acid reacts with the glucose and forms gluconic acid and chlorine dioxide. After the reaction is complete, the solution is evaporated to a thin sirup which is neutralized by the addition of calcium carbonate in excess. The insoluble residue, which comprises the excess calcium carbonate and calcium phosphate, is separated by filtration. The filtrate is saturated with ethyl alcohol and is seeded with calcium gluconate crystals. In the course of several hours, calcium gluconate separates from solution in good yield.

In case the sodium salt is desired, sodium chlorite and acetic acid is used as the oxidant. The solution of the sodium salt thus obtained, may then be used for the production of the lactone or other derivative.

Example 3

If the process of the present invention is used in connection with sodium calcium galacturonate, the process is as follows: The sodium calcium galacturonate, $NaCa(C_6H_9O_7)_3.6H_2O$, is first prepared by the process set forth in my copending application Serial No. 450,065, filed July 7, 1942.

Crystalline sodium calcium galacturonate is then suspended in a cold 10% aqueous solution of sodium chlorite in the proportion of approximately 10 moles of sodium chlorite for each mole of the double salt, and aqueous hydrochloric acid is added slowly to the mixture. The hydrochloric acid liberates chlorous acid which oxidizes the galacturonate to mucic acid. The mucic acid then crystallizes from solution. Sufficient hydrochloric acid is added to convert the sodium and calcium salts to chloride. The mucic acid thus obtained may be separated conveniently by filtration.

The invention may be variously modified and embodied within the scope of the subjoined claims.

I claim:

1. A step in the process of making dicarboxylic acids, which comprises the oxidation of the aldehyde group of a uronic acid with chlorous acid.

2. The process which comprises the oxidation of galacturonic acid with a chlorite, and the separation of the resulting mucic acid.

3. The process of making mucic acid which comprises treating galacturonic acid with a soluble chlorite, followed by the separation of mucic acid.

4. The process which comprises the oxidation of sodium calcium galacturonate with chlorous acid, and the separation of the resulting mucic acid.

5. A step in the process of making mucic acid, which comprises treating sodium calcium galacturonate with sodium chlorite and a mineral acid.

6. The process of oxidizing galacturonic acid which comprises treatment with calcium chlorite and the separation of the resulting calcium mucate.

HORACE S. ISBELL.